US012789662B2

(12) United States Patent
Wyand et al.

(10) Patent No.: US 12,789,662 B2
(45) Date of Patent: Nov. 10, 2026

(54) SELECTIVE RAPID DISCONNECTION OF A CHARGING DEVICE

(71) Applicant: Siemens Aktiengesellschaft, Munich (DE)

(72) Inventors: Sydney Justin Wyand, Neuhof an der Zenn (DE); Rudi Schalling, Leipzig (DE)

(73) Assignee: Siemens Aktiengesellschaft, Munich (DE)

( * ) Notice: Subject to any disclaimer, the term of this patent is extended or adjusted under 35 U.S.C. 154(b) by 787 days.

(21) Appl. No.: 18/251,572

(22) PCT Filed: Oct. 29, 2021

(86) PCT No.: PCT/EP2021/080122

§ 371 (c)(1),
(2) Date: May 3, 2023

(87) PCT Pub. No.: WO2022/096393

PCT Pub. Date: May 12, 2022

(65) Prior Publication Data

US 2024/0010091 A1 Jan. 11, 2024

(30) Foreign Application Priority Data

Nov. 3, 2020 (DE) .................... 10 2020 213 802.8

(51) Int. Cl.
*B60L 53/62* (2019.01)
*B60L 53/16* (2019.01)
(Continued)

(52) U.S. Cl.
CPC ............... *B60L 53/62* (2019.02); *B60L 53/16* (2019.02); *B60L 53/66* (2019.02); *H02J 7/663* (2026.01); *B60L 2240/545* (2013.01)

(58) Field of Classification Search
CPC ...................................................... B60L 53/62
(Continued)

(56) References Cited

U.S. PATENT DOCUMENTS

| | | |
|---|---|---|
| 5,926,004 A | 7/1999 | Henze |
| 11,318,858 B2 | 5/2022 | Zheng et al. |

(Continued)

FOREIGN PATENT DOCUMENTS

| | | |
|---|---|---|
| CN | 107444188 A | 12/2017 |
| WO | WO 9919959 A1 | 4/1999 |

(Continued)

*Primary Examiner* — Yalkew Fantu
(74) *Attorney, Agent, or Firm* — Laurence A. Greenberg; Werner H. Stemer; Ralph E. Locher

(57) ABSTRACT

A charging device has first and second charging connections, power converters and a primary switch connected between the charging connections and the power converters. The primary switch connects a first group of power converters to the first charging connection and a second group of power converters to the second charging connection. The control unit checks a rapid disconnection condition for each charging connection, to identify a causative charging connection of the first and second charging connections in the event of a positive checking result of the rapid disconnection condition, and to disconnect the first group of power converters and to leave the second group of power converters connected if the causative charging connection is the first charging connection, and to disconnect the second group of power converters and to leave the first group of power converters connected if the causative charging connection is the second charging connection.

11 Claims, 3 Drawing Sheets

(51) Int. Cl.
*B60L 53/66* (2019.01)
*H02J 7/60* (2026.01)

(58) Field of Classification Search
USPC .......................................................... 320/109
See application file for complete search history.

(56) References Cited

U.S. PATENT DOCUMENTS

| | | | | |
|---|---|---|---|---|
| 2015/0326040 | A1 | 11/2015 | Kawai et al. | |
| 2018/0060776 | A1* | 3/2018 | Ahmed ................ | G07C 5/0808 |
| 2018/0212438 | A1* | 7/2018 | Bouman ................. | B60L 53/11 |
| 2020/0052505 | A1 | 2/2020 | Senturk | |
| 2020/0052507 | A1 | 2/2020 | Apeldoorn et al. | |
| 2021/0237610 | A1* | 8/2021 | Zheng ..................... | B60L 53/11 |

FOREIGN PATENT DOCUMENTS

| | | | |
|---|---|---|---|
| WO | WO 2018192960 | A1 | 10/2018 |
| WO | WO2020078289 | * | 4/2020 |
| WO | WO 2020078289 | A1 | 4/2020 |

* cited by examiner

SELECTIVE RAPID DISCONNECTION OF A CHARGING DEVICE

FIELD AND BACKGROUND OF THE INVENTION

The invention relates to a charging device having at least two charging ports for a respective electric vehicle, and to a method for operating such a charging device.

Charging devices for electric vehicles can use different standards for controlling charging operations. These standards include, inter alia, the combined charging system (CCS), which enables direct current charging and alternating current charging, and CHAdeMO as a pure direct current charging standard. In this case, a charging device may have a plurality of charging ports with the same standard or with different standards. In the case of direct current charging, a conversion of the AC voltage from a supply network to a DC voltage is usually carried out in the charging device, with the level of the DC voltage being set to a value requested by the electric vehicle. This requires power converters which carry out rectification of the AC voltage and in a second step set the level of the DC voltage obtained by rectification. The charging ports can use the available power converters either sequentially or in parallel, in accordance with the architecture of the charging device. In the case of sequential use, it is only ever possible at any one time to charge one of the vehicles connected to the charging device, while a plurality of charging operations can be carried out simultaneously in the case of parallel use.

WO1999/19959A has disclosed a charging arrangement in which electrical power provided by a plurality of power converters can be variably routed to one of a plurality of charging ports by virtue of the electrical power being flexibly distributed between the charging ports by way of a switch arrangement. The switch arrangement between the power converters on the one hand and the charging ports on the other hand is often referred to as the switching matrix. An optimal use of the installed power converters can be obtained thereby.

Should the charging operation have to be terminated by way of an emergency disconnection in a dangerous situation, there are very short time intervals, defined by standards, for lowering current and voltage to non-dangerous values. Output switches upstream of each of the charging ports can be opened to this end.

It is an object of the invention to introduce an improved charging device with a plurality of charging ports and variably connectable power converters. The invention achieves this object by way of a charging device as claimed in the independent charging device claim and a method for operating a charging device as claimed in the independent method claim. Advantageous embodiments of the invention are the subject matter of the dependent claims.

SUMMARY OF THE INVENTION

A first aspect of the invention relates to a charging device having at least a first and a second charging port, a plurality of power converters, and a primary switch arrangement connected between the charging ports and the power converters. In this case, each charging port is designed to establish a detachable connection to a respective electric vehicle. The primary switch arrangement has control inputs connected to control outputs of a control unit and is designed to connect, depending on control signals from the control unit received at the control inputs, a first group of power converters with a variably selectable first number of power converters to the first charging port and a second group of power converters with a variably selectable second number of power converters to the second charging port. The control unit is designed to provide the control signals according to a respective performance requirement for the charging ports. According to the invention, the control unit is also designed to check a rapid disconnection condition for each charging port, to identify a causative charging port from among the first and second charging port in the case of a positive test result in relation to the rapid disconnection condition, and to disconnect the first group of power converters and to leave the second group of power converters switched on if the causative charging port is the first charging port, and also to disconnect the second group of power converters and to leave the first group of power converters switched on if the causative charging port is the second charging port.

The invention is based on and includes the insight that a rapid disconnection can be implemented by way of disconnecting the power converters. This allows the use of comparatively small and cost-effective output switches for the charging ports as these no longer need to be dimensioned to switch under load. Moreover, the inventors have recognized that a disconnection of all power converters would mean a termination of all charging operations occurring in parallel, even though a requirement for a rapid disconnection typically only exists for one charging port. The invention therefore provides for the disconnection of only those power converters that are connected to the charging port for which a requirement of a rapid disconnection exists. Since an impairment of the other charging operations is precluded in this manner, the threshold for the detection of a rapid disconnection requirement can be lowered, with the result that the charging device according to the invention enables improved safety and better fuse protection for the electric vehicles. By way of example, the control unit can be designed to check for a presence of a state or state change that is impermissible according to a charging protocol, an overshoot of a threshold temperature, or an unexpected state change of a charging plug locking mechanism for each charging port as the rapid disconnection condition. The widespread charging standards such as CCS or CHAdeMO define charging protocols, on the basis of which a charging operation between the electric vehicle and the charging device is controlled. In the process, states between which it is possible to switch are defined. However, it is not possible to change between any two states or it is necessary for certain conditions to be satisfied before a state change is permissible. If these provisions are infringed, for example by way of an incorrectly implemented charging controller of an electric vehicle or by an external influence on the charging operation, then there is an error, the effect of which on the charging operation may have varying severity. The charging device of the invention allows monitoring of the charging protocol and a response to inadmissible state changes if a risk to the electric vehicle connected to the affected charging port or to the charging device is expected on account of the specific inadmissible state change or, generally, for all inadmissible state changes. As already mentioned above, the rapid disconnection does not impair any electric vehicles in this case other than the one connected to the affected charging port. The overshoot of a threshold temperature may relate to a temperature of a charging cable or a contact of the charging cable, which can be measured by appropriate sensors. By way of example, the threshold temperature can be defined between 80 and 95 degrees Celsius. The unexpected state change of the charging plug locking mechanism may for example relate to the charging plug locking mechanism unlocking during the charging operation, in the case of which the creation of dangerous arcs must be feared on account of the high flowing currents. The charging device according to the invention can provide for the testing of one of the mentioned rapid disconnection conditions or any desired combination of the mentioned rapid disconnection conditions.

The charging device may be equipped with main switches connected between a power supply connection of the charging device and supply inputs of the power converters. In such a case, the control unit is preferably designed to keep the main switches closed in the case of a positive test result in relation to the rapid disconnection condition. As a result, the power converters can continue to be supplied despite the rapid disconnection, and so the charging operations of the charging ports not affected by the rapid disconnection can continue.

Particularly preferably, the control unit of the charging device is moreover designed to check for an emergency disconnection condition and to disconnect all power converters in the case of a positive test result in relation to the emergency disconnection condition and to isolate the charging ports by opening output switches after a waiting time has elapsed. This is advantageous as this allows a graduated response to different errors and risks. The rapid disconnection can advantageously be carried out selectively for affected charging ports for less serious errors, like those described above, while all power converters can be disconnected and all charging ports can be isolated in the case of serious errors. In this case, waiting for the waiting time to elapse serves to allow the voltages and currents at the contacts of the output switches to drop sufficiently for an opening of the output switches since these are maintained for a certain period of time as a result of capacitances and inductances of the output filters. As a result, an emergency disconnection of the entire charging device can also be carried out within the prescribed time intervals without requiring to this end expensive and large output switches which are able to switch under load. Examples of emergency disconnection conditions include an opening of a door of the charging device, which may mean an open access to the power electronic components of the charging device, or an activation of an emergency disconnection button of the charging device.

In embodiments with line-side main switches, the control unit may also be designed to additionally open the main switches in the case of a positive test result in relation to the emergency disconnection condition. This switches the charging device to be voltage free, with the result that the charging device is not damaged and there is no risk to the surroundings of the charging device.

In a particularly advantageous embodiment of the charging device according to the invention, each power converter has a signal input for a rapid disconnection signal. The charging device has a secondary switch arrangement, which has a switch topology corresponding to that of the primary switch arrangement. This means that the number of switches and the interconnection thereof is the same for the primary switch arrangement and the secondary switch arrangement; however, type, size, and voltage and current carrying capacity of the switches typically differ between the primary switch arrangement and the secondary switch arrangement. In this case, each input for a respective power converter of the primary switch arrangement is assigned an output, connected to the signal input of the respective power converter, of the secondary switch arrangement and each output for a respective charging port of the primary switch arrangement is assigned an input, connected to a signal output of the control unit, of the secondary switch arrangement. The secondary switch arrangement thus enables a signal flow which mirrors the power flow in the primary switch arrangement but runs in the opposite direction: while the primary switch arrangement summates power from the power converters and guides said power to the respective charging ports, the secondary switch arrangement guides a disconnection signal applied to one of its inputs to the power converters connected to the affected charging port. The control electrodes of switches assigned to one another of the primary and the secondary switch arrangement are directly or indirectly connected to one another for this purpose. This causes the switching state of the primary switch arrangement and of the secondary switch arrangement to be the same in principle. In this case, the control unit is designed to output a rapid disconnection signal to the input of the secondary switch arrangement assigned to the causative charging port from among the first and the second charging port in the case of a positive test result in relation to the rapid disconnection condition. The secondary switch arrangement replicates the primary switch arrangement and adopts the same switching state as the primary switch arrangement on account of the direct or indirect connection of the control electrodes of the switches of the two switch arrangements. As a result, a rapid disconnection signal applied to an input, assigned to the causative charging port, of the secondary switch arrangement reaches all power converters connected to the causative charging port (and only reaches these power converters) and disconnects said power converters. The secondary switch arrangement is robust in relation to malfunctions of the control unit as the latter need not initially ascertain internally which power converters are connected to which charging port and which power converters need to be disconnected within the scope of the selective rapid disconnection. The rapid disconnection signal for the causative charging port reaches the correct power converters from the control unit directly after output, with the result that the power converters are disconnected with minimal delay following a positive test result in relation to the rapid disconnection condition.

In the case of embodiments of the charging device according to the invention in which the control unit is designed to check an emergency disconnection condition, the control unit can moreover be designed to output the rapid disconnection signal to all inputs of the secondary switch arrangement in the case of a positive test result in relation to the emergency disconnection condition. All power converters are rapidly disconnected hereby in the case of an emergency disconnection.

The charging device according to the invention is particularly preferably designed to output a direct current at the charging ports. What is known as DC charging is suitable for high charging powers and, on account of the lack of zero crossings like in the case of an alternating current, connected with particularly high requirements in relation to the output switches of the charging ports, with the result that the invention can be used particularly advantageously on account of the reduced requirements in relation to the output switches for charging devices that provide charging with direct currents.

In this case, the power converters of the charging device are typically—but not necessarily—designed to convert an alternating current into a direct current. On account of its zero crossings, an alternating current can be switched comparatively easily, for the purposes of which for example the aforementioned main switches, which are linked to comparatively low costs and dimensions, can be provided. Such a charging device can be connected directly or indirectly (e.g., by way of a transformer) to a power supply system.

A second aspect of the invention relates to a method for operating a charging device. The method according to the invention includes at least the following steps:

- connecting a first group of power converters with a variably selectable first number of power converters to a first charging port of the charging device;
- connecting a second group of power converters with a variably selectable second number of power converters to a second charging port of the charging device;
- checking a rapid disconnection condition for each charging port; and
- if the rapid disconnection condition is satisfied for a causative charging port from among the first and second charging port, disconnecting the first group of power converters and leaving the second group of power converters switched on if the causative charging port is the first charging port, and disconnecting the second group of power converters and leaving the first group of power converters switched on if the causative charging port is the second charging port.

BRIEF DESCRIPTION OF THE FIGURES

The invention is explained in more detail below on the basis of drawings of exemplary embodiments. In detail.

DETAILED DESCRIPTION OF THE INVENTION

Figure 1:
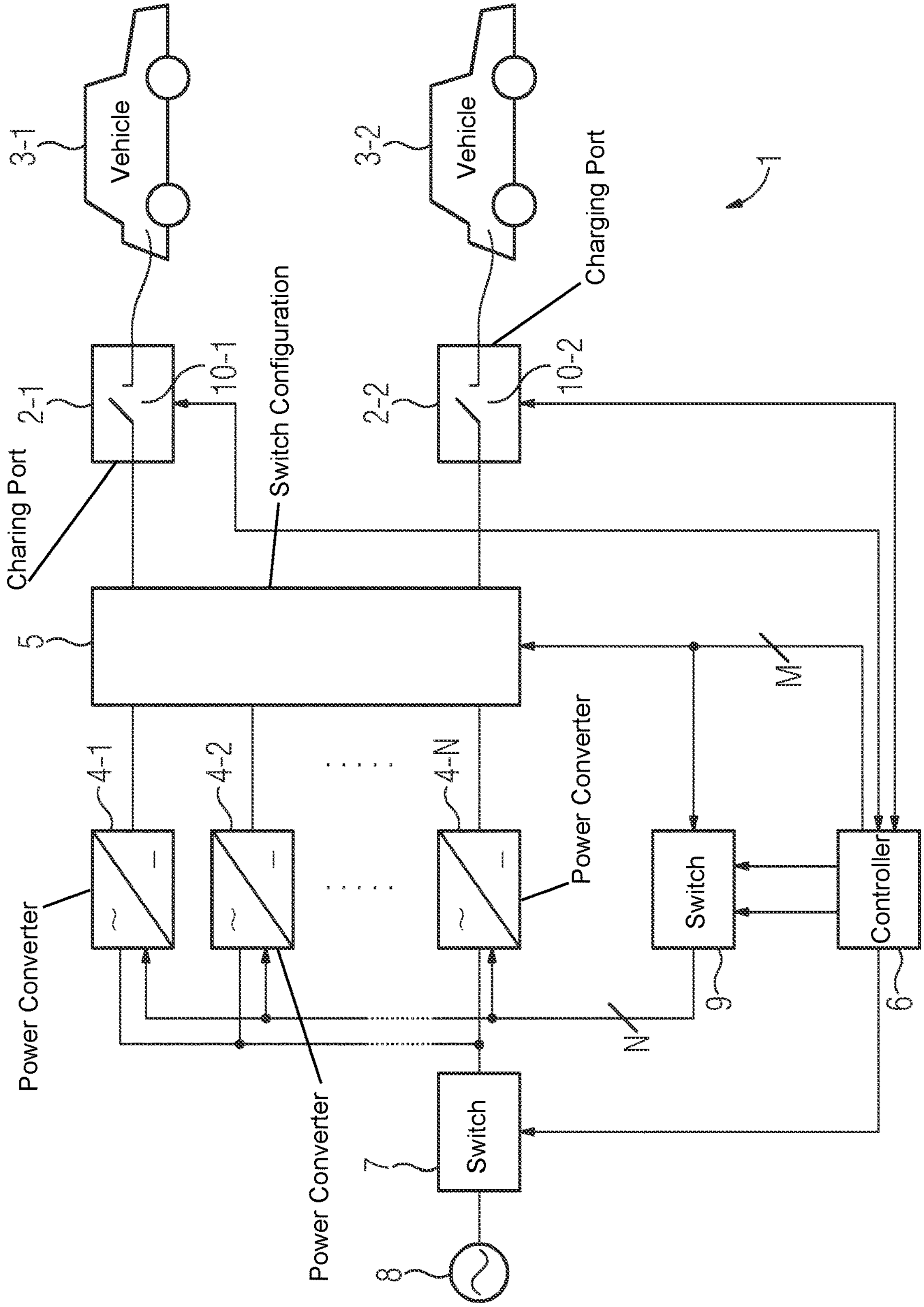
FIG. 1 shows a first exemplary embodiment of a charging device according to the invention.

FIG. 1 shows a first exemplary embodiment of a charging device 1 according to the invention, which is supplied by a power supply system via a power supply connection 8 and which is capable of charging electric vehicles 3-1, 3-2 via respective charging ports 2-1, 2-2. The connection to the power supply system will usually be three phase but the connection has been illustrated via one phase only in the present case in order to simplify the illustration.

The charging device 1 of the exemplary embodiment comprises main switches 7 provided to isolate the charging device 1 from the power supply system. Since the power supply system is in the form of an alternating current network, the main switches 7 can be designed with relatively little complexity since isolation can be implemented during a zero crossing of the alternating current, and hence without an arc forming or with only little arc formation.

The supply voltage reaches a plurality of power converters 4-1, 4-2, . . . , 4-N, which generate a DC voltage with an adjustable voltage level from the supply voltage, via the main switches 7. Even though the power converters 4-1, 4-2, . . . , 4-N are illustrated as AC/DC converters in the present case, the power converters could, in principle, also be supplied with a DC voltage or else the electric vehicles 3-1, 3-2 could, in principle, also be charged by an AC voltage. In the example shown, the number of power converters 4-1, 4-2, . . . , 4-N is greater than the number of charging ports 2-1, 2-2, but this is thus not mandatory. Alternatively, provision can also be made for a number of power converters 4-1, 4-2, . . . , 4-N to equal the number of charging ports 2-1, 2-2, or else provision can also be made for there to be fewer power converters 4-1, 4-2, . . . , 4-N. Naturally, more than two charging ports 2-1, 2-2 may also be provided as a matter of principle.

The charging device 1 comprises a primary switch arrangement 5 which serves to variably split the electrical power output by the power converters 4-1, 4-2, . . . , 4-N among the charging ports 2-1, 2-2 by virtue of the outputs of each power converter 4-1, 4-2, . . . , 4-N being connected to exactly one of the charging ports 2-1, 2-2. As a result, it becomes possible to assign unused power converters 4-1, 4-2, . . . , 4-N to a charging port 2-1, 2-2 actually used by an electric vehicle in order to charge the electric vehicle 3-1, 3-2 connected to the used charging port 2-1, 2-2 in accordance with a corresponding performance requirement of the electric vehicle 3-1, 3-2 with a higher charging power. By contrast, at the end of a charging operation, charging is usually implemented with a comparatively low power, which is why individual power converters 4-1, 4-2, . . . , 4-N can be decoupled again from the affected charging port 2-1, 2-2 and optionally can be used advantageously at a different charging port 2-1, 2-2.

For this purpose, the primary switch arrangement 5 contains a plurality of switches (a number M of switches in the present case), which can be put into the conducting or blocking state by a control unit 6. Different degrees of freedom are possible when connecting the power converters 4-1, 4-2, . . . , 4-N to the charging ports 2-1, 2-2, depending on the switch topology of the primary switch arrangement 5. A switch topology with more switches will usually allow greater freedom when grouping and connecting the power converters 4-1, 4-2, . . . , 4-N than one with fewer switches, but having more switches creates correspondingly greater complexity which is not always justified by the increased flexibility and utilization of the power converters 4-1, 4-2, . . . , 4-N. In general, a supply of switch topologies—frequently referred to as a "switching matrix"—is available in the prior art, from which a selection can be made for a respective application. The output switches 10-1, 10-2, with which a respective charging port 2-1, 2-2 can be separated from an electric vehicle 3-1, 3-2 or generally the surroundings of the charging device 1 and which were mentioned at the outset, are not considered part of the primary switch arrangement in the present case. These output switches 10-1, 10-2 may form a part of the charging ports 2-1, 2-2.

The control unit 6 is connected to the charging ports 2-1, 2-2. By way of example, this connection allows the control unit 6 to communicate with the electric vehicles 3-1, 3-2 connected to the charging ports 2-1, 2-2, for the purposes of which the charging ports 2-1, 2-2 may contain suitable communications devices. In this case, the control unit 6 can control the charging operations for the connected electric vehicles 3-1, 3-2 in communication with the latter, and can also monitor the observance of the charging protocols such as CCS and CHAdeMO relevant to the charging operations, that is to say in particular check for state changes and states. The control unit 6 can likewise receive temperature values from temperature sensors arranged in the charging ports 2-1, 2-2 or receive sensor signals from charging plug locking mechanisms of the charging ports 2-1, 2-2, and thereby monitor whether the temperatures at the charging ports 2-1, 2-2 are within safe limits and whether the charging plug locking mechanisms remain in the expected state. If the control unit 6 identifies a problem in the process, for example an inadmissible state, an inadmissible state change, a temperature overshoot or an unexpectedly unlocked charging plug at a charging port 2-1, 2-2, then the control unit 6 responds according to the invention with a rapid disconnection of precisely those power converters 4-1, 4-2, . . . , 4-N connected to the causative charging port 2-1, 2-2 by way of the primary switch arrangement 5, but leaves the power converters 4-1, 4-2, . . . , 4-N connected to charging ports 2-1, 2-2 other than the causative charging port 2-1, 2-2 unchangingly activated (unless of course a problem is simultaneously present at a plurality of charging ports 2-1, 2-2). To this end, each of the power converters 4-1, 4-2, . . . , 4-N has a signal input, by means of which a rapid disconnection of the power converter 4-1, 4-2, . . . , 4-N can be caused. If output switches 10-1, 10-2 are provided in the charging ports 2-1, 2-2, then these output switches can be opened by the control unit 6 after a delay of a waiting time that follows the causation of the rapid disconnection of the charging converters 4-1, 4-2, . . . , 4-N. The waiting time ensures that the power converters 4-1, 4-2, . . . , 4-N are actually already disconnected and inductances and capacitances present in the charging path, for example from output filters, have at least largely discharged. Since the charging ports 2-1, 2-2 are at least largely current-free after the waiting time has elapsed, the output switches 10-1, 10-2 can be realized in a correspondingly space-saving and cost-effective manner.

Instead of the just described selective rapid disconnection, the control unit 6 can also perform an emergency disconnection of the entire charging device 1. By way of example, this may be implemented if the control unit 6 notices by way of an appropriate sensor (not illustrated) that a housing of the charging device 1 (in particular a door, inspection flap or the like) is opened while the charging device 1 is energized or if an emergency disconnection button (not illustrated) is pressed. In this case, the control unit 6 can simultaneously cause all power converters 4-1, 4-2, . . . , 4-N to rapidly disconnect, can open the main switch 7, and, after the waiting time has elapsed, can finally open the output switches 10-1, 10-2.

In a particularly simple implementation of the invention, the selective rapid disconnection of only those power converters 4-1, 4-2, . . . , 4-N which are connected to the causative charging port 2-1, 2-2 at the time of the positive check for a rapid disconnection condition can be carried out by the control unit 6 for example by consulting a corresponding data record stored in a memory of the control unit 6, with the data record noting the current connection status of each of the power converters 4-1, 4-2, . . . , 4-N and being updated with a change. However, this is comparatively susceptible to errors because such a software-based implementation can unexpectedly fail for a number of reasons. Therefore, a secondary switch arrangement 9 which has a switch topology identical to the primary switch arrangement 5 is provided in preferred exemplary embodiments of the invention, as also shown in FIG. 1. However, because the secondary switch arrangement only switches signals while the primary switch arrangement 5 conducts high currents, very small and cost-effective switches can be used for the secondary switch arrangement 9.

Each switch of the primary switch arrangement 5 is assigned a switch of the secondary switch arrangement 9, with each switch of one switch arrangement 5, 9 being connected to the other switches of the same switch arrangement 5, 9 in a manner corresponding to the way in which the assigned switch of the other switch arrangement 5, 9 is connected to the other switches of the other switch arrangement 5, 9. In the case of a two-pole embodiment of the primary switch arrangement 5, in which both the electrically positive and the electrically negative path are switched, each switch of the primary switch arrangement contains two switching units, one of which is provided for the positive path and one of which is provided for the negative path, in accordance with the definition used here. By contrast, the secondary switch arrangement has a one-pole embodiment, with the result that each switch of the secondary switch arrangement also contains only one switching unit or is such a switching unit.

The control electrodes of a respective switch and of the switch of the other switch arrangement 5, 9 assigned to said switch can be interconnected directly or, for example in the case of a required level adjustment or logical inversion, indirectly (for example via amplifiers or inverters), with the result that a modified assignment of a power converter 4-1, 4-2, . . . , 4-N to a charging port 2-1, 2-2 immediately also leads to a corresponding modified switching state of the secondary switch arrangement. In this way, it becomes possible at any time without additional outlay to address the power converters 4-1, 4-2, . . . , 4-N assigned to a causative charging port 2-1, 2-2. Should the control unit 6 apply a disconnection signal to an input of the secondary switch arrangement 9 assigned to the causative charging port 2-1, 2-2, then said disconnection signal reaches all power converters 4-1, 4-2, . . . , 4-N connected to the causative charging port 2-1, 2-2, in parallel via the secondary switch arrangement 9, and causes said power converters to rapidly disconnect. For an emergency disconnection, the control unit 6 can accordingly apply a disconnection signal to all inputs of the secondary switch arrangement 9.

The use of the described secondary switch arrangement 9 is particularly robust against malfunctions. By way of example, the control unit 6 can be implemented fully or partially in hardware without the use of a microcontroller or the like. By way of example, a door sensor or an emergency disconnection button can be connected directly or indirectly via driver stages or holding elements to all inputs of the secondary switch arrangement 9, and locking sensors and/or temperature sensors of the charging ports 2-1, 2-2 can be connected to the respectively assigned inputs of the secondary switch arrangement 9, with the result that there is no need to resort to error-prone software routines at least for the rapid disconnection conditions and emergency disconnection conditions checked in this way. By contrast, monitoring of the charging protocols as described above can be implemented on the basis of either software or hardware. Hardware-based monitoring of the charging protocols may require some outlay but once again offers the advantage of greater reliability vis-à-vis software implementations, with the latter however being simpler and more cost-effective. In the case of software-based monitoring of the charging protocols, it is possible for the control unit 6 to consist of a combination of a microcontroller or the like and the described directly wired hardware solution. In general, the control unit 6 need not be a simple component or a locally contained functional group but may be constructed as a distributed arrangement with a plurality of subordinate control units which for example implement different partial tasks of the control unit 6.

Figure 2:
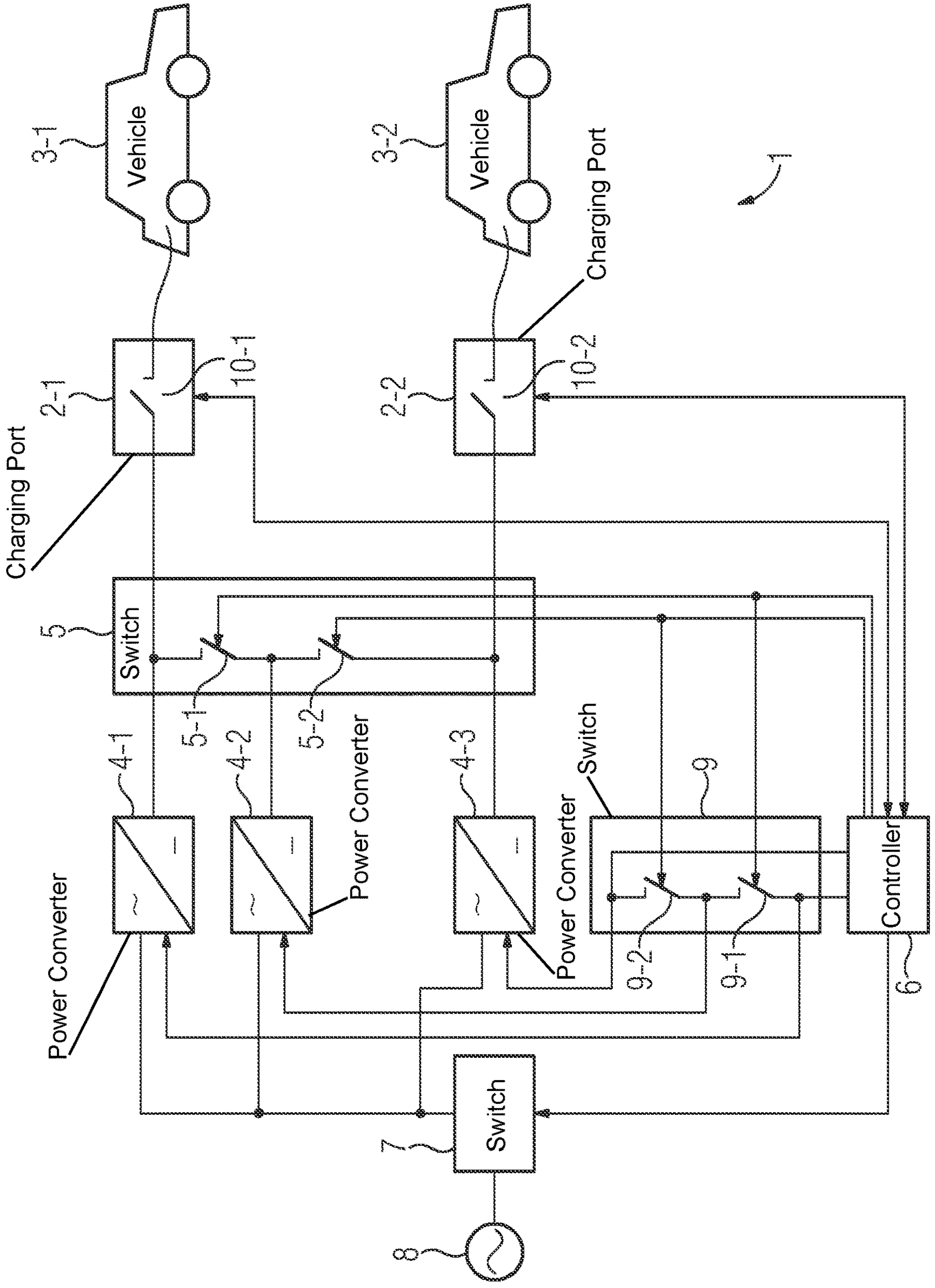
FIG. 2 shows a second exemplary embodiment of a charging device according to the invention.

FIG. 2 shows a second exemplary embodiment of a charging device 1 according to the invention, which is largely similar to the example in FIG. 1. Corresponding parts are therefore not described anew. The second exemplary embodiment has exactly three power converters 4-1, 4-2, 4-3 and a primary switch arrangement 5 with a particularly simple switch topology comprising only two switches 5-1, 5-2. Since electrical isolation of the electric vehicles 3-1, 3-2 from one another is usually provided, the switch topology shown here only for one current path is implemented twice in such cases, specifically once for each polarity, with the result that four switches would in actual fact have to be provided in the example shown; however, this is not illustrated for reasons of improved clarity.

The two switches 5-1 and 5-2 allow the power converter 4-2 to be assigned to the charging port 2-1 by closing the switch 5-1 and opening the switch 5-2. Alternatively, the power converter 4-2 can be connected to the charging port 2-2 by opening the switch 5-1 and closing the switch 5-2. As a result, two of the power converters 4-1, 4-2, 4-3 can be selectively connected to one of the two charging ports 2-1, 2-2, while the remaining power converter 4-1 or 4-3 is connected to the other charging port 2-1, 2-2. With the inclusion of output switches 10-1, 10-2 provided in the charging ports 2-1, 2-2, it may moreover be possible to connect all three power converters 4-1, 4-2, 4-3 to one charging port 2-1, 2-2 by closing both switches 5-1 and 5-2 and opening an output switch 10-1, 10-2 of one of the charging ports 2-1, 2-2, while the other charging port 2-1, 2-2 remains isolated.

The second exemplary embodiment of the charging device 1 according to the invention once again comprises a secondary switch arrangement 9, which has a switch topology corresponding to the primary switch arrangement 5, two switches 9-1, 9-2 in the present case. A twofold embodiment can be dispensed with in the case of the secondary switch arrangement 9 since electrical isolation is not required here. The switches 9-1, 9-2 are interconnected in a manner identical to the switches 5-1, 5-2. The control electrode of the switch 9-1 is connected to that of the switch 5-1 and the control electrode of the switch 9-2 is connected to that of the switch 5-2, with the result that all switches 5-1, 9-1 and 5-2, 9-2 assigned to one another adopt identical switching states. Each output of the primary switch arrangement 5 connected to a charging port 2-1, 2-2 is assigned an input of the secondary switch arrangement 9, by way of which the control unit 6 can distribute a rapid disconnection signal to the power converters 4-1, 4-2, 4-3 connected to a causative charging port 2-1, 2-2. Accordingly, the secondary switch arrangement 9 has a signal output for each input of the primary switch arrangement 5, said signal output being connected to the same power converter 4-1, 4-2, 4-3 as the input of the primary switch arrangement 5.

Naturally, more complex primary and secondary switch arrangements may be provided in the case of exemplary embodiments of the invention with a secondary switch arrangement and more than three power converters 4-1, 4-2, 4-3 and/or more than two charging ports 2-1, 2-2.

Figure 3:
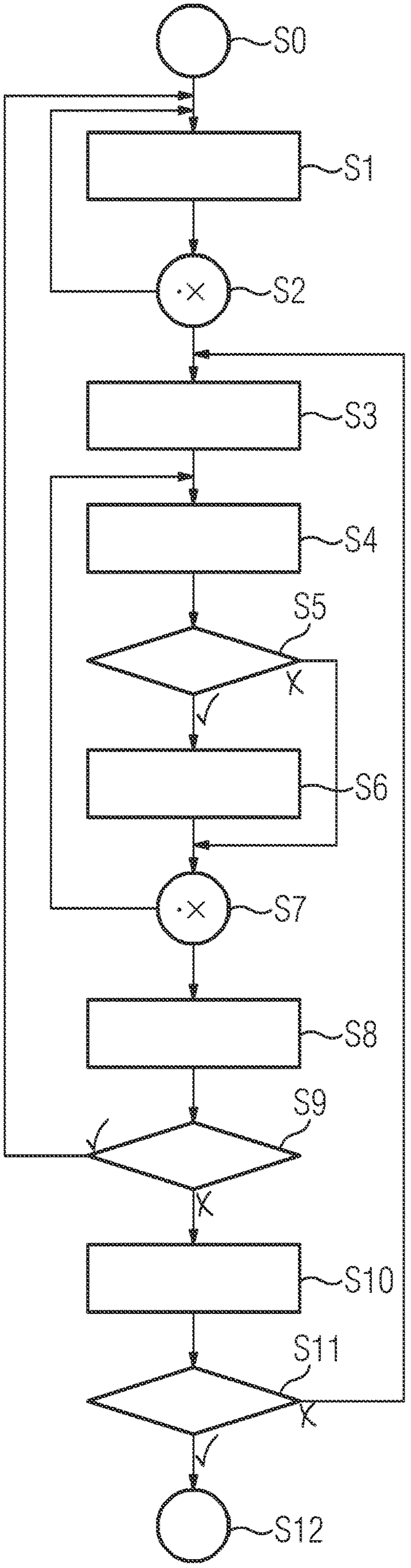
FIG. 3 shows an exemplary embodiment of a method according to the invention for operating a charging device.

FIG. 3 shows an exemplary embodiment of a method according to the invention for operating a charging device, for example one of the charging devices 1 from FIG. 1 or 2. The method starts with a start step S0 and continues in a step S1, in which, for each of X active charging ports, a respective group of power converters is connected to the charging port. In principle, a group of power converters may also comprise only a single power converter. Accordingly, the step S1 is carried out X-times by way of a loop S2. Instead of working through this iteratively, use can naturally also be made of parallel methods. Subsequently, the electric vehicles connected to the charging ports are charged in a step S3 in accordance with the interconnection of the power converters.

In step S4, which may also be carried out continuously in parallel with the charging in step S3, at least one rapid disconnection condition is checked for a respective charging port. If the check is negative (that is to say, if no fast disconnection is required for the checked charging port), step S6 is skipped by way of appropriate branching in step S5. In the other case, the rapid disconnection of the power converters connected to the checked charging port is caused in step S6. Steps S4, S5 and optionally S6 are carried out for each of the X charging ports, that is to say X-times, in accordance with a loop S7. Here too, a parallel procedure may be chosen in place of an iterative one.

In step S8, a check is carried out as to whether an altered performance requirement has been received from one of the charging ports. Should this be the case, there is branching back to step S1 in step S9, with the result that a modified grouping of the power converters can be implemented in accordance with the altered performance requirement. The other case continues with step S10, in which a check is carried out as to whether all charging operations have been completed. Should this not be the case, there is branching back from step S11 to step S3, in which the charging of the connected electric vehicle or vehicles continues with the unmodified grouping of the power converters. By contrast, if all charging operations have been completed in step S10, there is branching in S11 to an end S12 of the method.

The method shown in FIG. 3 allows numerous modifications. In particular, it can be extended by further steps, for example for the implementation of an emergency disconnection or other features described above in relation to the charging device according to the invention.

The invention was described in more detail on the basis of exemplary embodiments. In this context, the exemplary embodiments only serve the better understanding of the invention and are not intended to restrict the invention, which is only defined by way of the claims below.

LIST OF REFERENCE SIGNS

1 Charging device
2-1, 2-2 Charging port
3-1, 3-2 Electric vehicle
4-1, 4-2, 4-3, . . . , 4-N Power converter
5 Primary switch arrangement
5-1, 5-2 Switch
6 Control unit
7 Main switch
8 Power supply connection
9 Secondary switch arrangement
9-1, 9-2 Switch
10-1, 10-2 Output switch

The invention claimed is:

1. A charging device, comprising:

charging ports including at least a first and a second charging port, each of said charging ports being configured to establish a detachable connection to a respective electric vehicle;

a plurality of power converters;

a controller having control outputs;

a primary switch configuration connected between said charging ports and said power converters and having control inputs connected to said control outputs of said controller, said primary switch configuration being configured to connect, depending on control signals from said controller received at said control inputs, a first group of said power converters with a variably selectable first number of said power converters to said first charging port and a second group of said power converters with a variably selectable second number of said power converters to said second charging port; and said controller configured to provide the control signals according to a respective performance requirement for said charging ports, said controller further configured to check a rapid disconnection condition for each of said charging ports, to identify a causative charging port from among said first and second charging port in a case of a positive test result in relation to the rapid disconnection condition, and to disconnect said first group of said power converters and to leave said second group of said power converters switched on if said causative charging port is said first charging port, and to disconnect said second group of said power converters and to leave said first group of said power converters switched on if said causative charging port is said second charging port.

2. The charging device according to claim 1, wherein said controller is configured to check for a presence of a state or state change that is impermissible according to a charging protocol, an overshoot of a threshold temperature, or an unexpected state change of a charging plug locking mechanism for each of said charging port as the rapid disconnection condition.

3. The charging device according to claim 1,
wherein said power converters have supply inputs;
further comprising a power supply connection of the charging device;
further comprising main switches connected between said power supply connection of said charging device and said supply inputs of said power converters; and
wherein said controller is configured to keep said main switches closed in a case of the positive test result in relation to the rapid disconnection condition.

4. The charging device according to claim 1, wherein:
said charging ports having output switches; and
said controller is configured to check for an emergency disconnection condition, and to disconnect all of said power converters in a case of a positive test result in relation to the emergency disconnection condition and to isolate said charging ports by opening said output switches after a waiting time has elapsed.

5. The charging device according to claim 4, wherein said controller is configured to additionally open said main switches in the case of the positive test result in relation to the emergency disconnection condition.

6. The charging device according to claim 1,
wherein each of said power converters has a signal input for the rapid disconnection signal;
wherein said primary switch configuration has inputs, outputs and switches with control electrodes; and
further comprising a secondary switch configuration having a switch topology corresponding to that of said primary switch configuration and having switches with control electrodes, inputs and outputs, with each input for a respective one of said power converters of said primary switch configuration being assigned an output, connected to said signal input of said respective power converter, of said secondary switch configuration and each said output for a respective one of said charging ports of said primary switch configuration being assigned an input, connected to a signal output of said controller, of said secondary switch configuration, with said control electrodes of said switches assigned to one another of said primary and said secondary switch configuration being directly or indirectly connected to one another, and with said controller being configured to output the rapid disconnection signal to said input of said secondary switch configuration assigned to said causative charging port from among said first and said second charging port in the case of the positive test result in relation to the rapid disconnection condition.

7. The charging device according to claim 6, wherein said controller is configured to output the rapid disconnection signal to all of said inputs of said secondary switch configuration in a case of a positive test result in relation to an emergency disconnection condition.

8. The charging device according to claim 1, wherein the charging device is configured to output a direct current at said charging ports.

9. The charging device according to claim 1, wherein said power converters are configured to convert an alternating current into a direct current.

10. The charging device according to claim 4,
further comprising a door;
further comprising an emergency disconnection button; and
wherein the emergency disconnection condition is an opening of said door of the charging device or an activation of said emergency disconnection button of the charging device.

11. A method for operating a charging device, the method comprising the following steps of:
connecting a first group of power converters with a variably selectable first number of the power converters to a first charging port of the charging device;
connecting a second group of power converters with a variably selectable second number of the power converters to a second charging port of the charging device;
checking a rapid disconnection condition for each of the first and second charging ports; and
if the rapid disconnection condition is satisfied for a causative charging port from among the first and second charging ports, disconnecting the first group of power converters and leaving the second group of power converters switched on if the causative charging port is the first charging port, and disconnecting the second group of power converters and leaving the first group of power converters switched on if the causative charging port is the second charging port.

* * * * *